United States Patent
Nick et al.

(10) Patent No.: US 7,598,856 B1
(45) Date of Patent: Oct. 6, 2009

(54) NAVIGATION AID FOR LOW-VISIBILITY ENVIRONMENTS

(75) Inventors: Mitchell R. Nick, Madison, WI (US); Chandler C. Nault, Madison, WI (US); Nick O'Brien, Apple Valley, MN (US); Michael G. Teff, Middleton, WI (US); Scott I. Biba, Madison, WI (US); Charles T. Younger, Madison, WI (US); Chad Schweitzer, Madison, WI (US)

(73) Assignee: Firesite LLC, Madison, WI (US)

( * ) Notice: Subject to any disclaimer, the term of this patent is extended or adjusted under 35 U.S.C. 154(b) by 320 days.

(21) Appl. No.: 11/668,017

(22) Filed: Jan. 29, 2007

Related U.S. Application Data

(60) Provisional application No. 60/763,757, filed on Jan. 31, 2006.

(51) Int. Cl.
*G08B 1/08* (2006.01)
(52) U.S. Cl. .............................. 340/539.13; 340/573.1; 455/456.1
(58) Field of Classification Search .............. 340/573.1, 340/321, 539.13, 286.05; 702/75; 455/456.1
See application file for complete search history.

(56) References Cited

U.S. PATENT DOCUMENTS

| | | | |
|---|---|---|---|
| 5,552,772 A | 9/1996 | Janky et al. | |
| 6,720,878 B2 * | 4/2004 | Jumpertz | 340/573.1 |
| 6,727,805 B2 * | 4/2004 | Hollister et al. | 340/326 |
| 6,826,117 B2 | 11/2004 | Haase et al. | |
| 6,895,333 B2 | 5/2005 | Hethuin et al. | |
| 6,952,574 B2 | 10/2005 | Tealdi et al. | |
| 7,054,747 B2 * | 5/2006 | Ruelke et al. | 702/2 |
| 7,295,114 B1 * | 11/2007 | Drzaic et al. | 340/572.1 |
| 7,342,648 B2 * | 3/2008 | Solomon et al. | 356/4.03 |
| 2001/0036832 A1 * | 11/2001 | McKay | 455/456 |
| 2005/0001720 A1 * | 1/2005 | Mason et al. | 340/539.13 |

\* cited by examiner

*Primary Examiner*—Brent Swarthout
(74) *Attorney, Agent, or Firm*—Craig A. Fieschko, Esq.; DeWitt Ross & Stevens S.C.

(57) ABSTRACT

A navigation system for navigating in low visibility environments includes a portable detection unit which uses position and orientation sensors and/or wireless location to track the position of the portable detection unit relative to some reference location, such as a fire truck. The relative position of the portable detection unit, and thus its user, is then output to a visual display for viewing by the user so that the user may see his/her position in a dark or smoky environment. The system may also include portable beacons which may be left at landmarks so that the relative positions of the landmarks may be seen on the visual display.

20 Claims, 2 Drawing Sheets

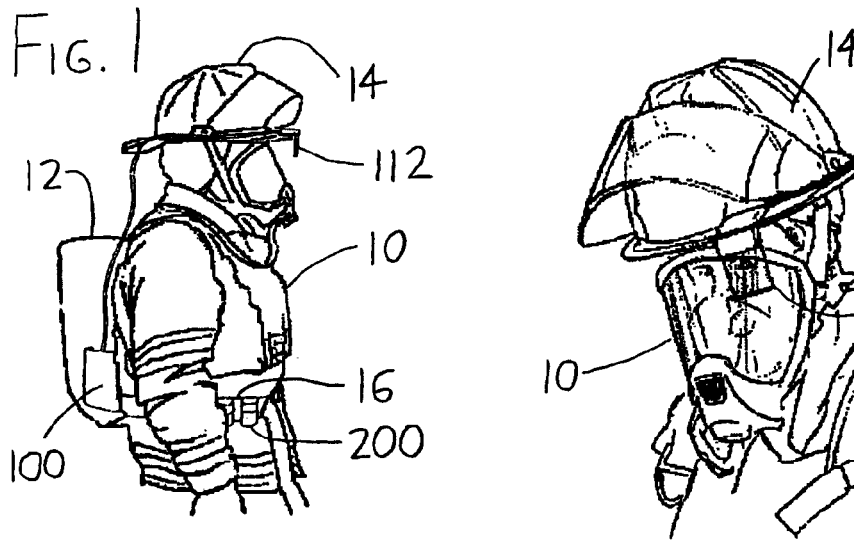
FIG. 1
FIG. 2
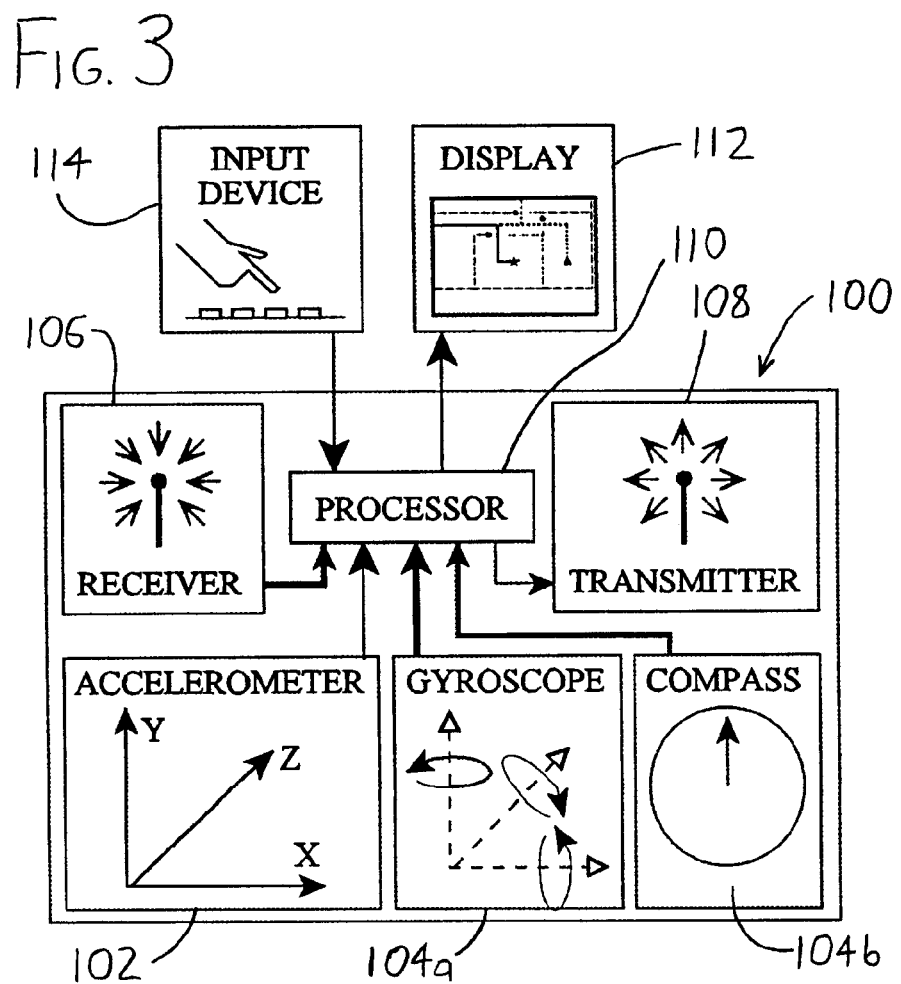
FIG. 3

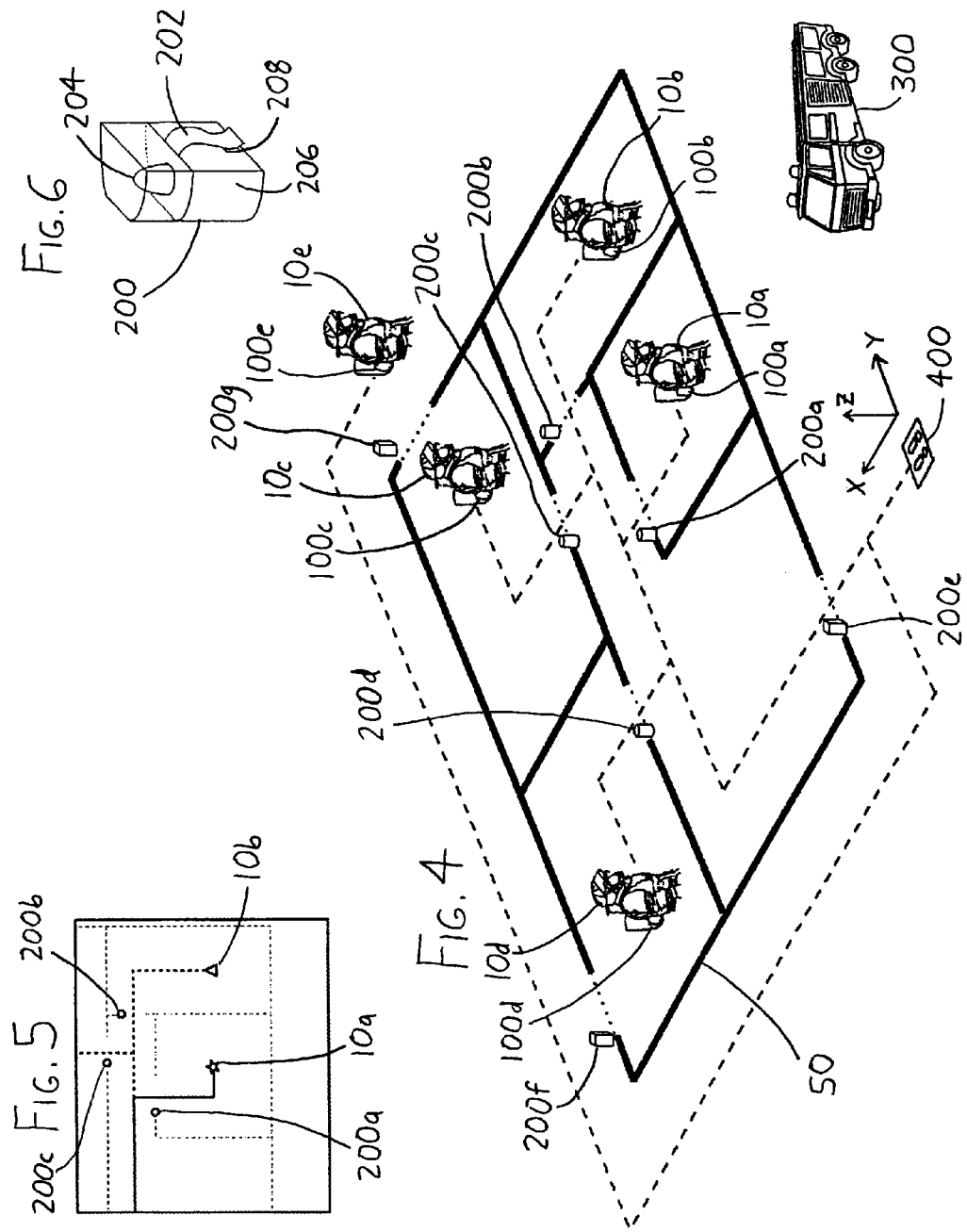

NAVIGATION AID FOR LOW-VISIBILITY ENVIRONMENTS

CROSS-REFERENCE TO RELATED APPLICATIONS

This application claims priority under 35 USC §119(e) to U.S. Provisional Patent Application 60/763,757 filed 31 Jan. 2006, the entirety of which is incorporated by reference herein.

FIELD OF THE INVENTION

This document concerns an invention relating generally to navigation aids for use in low-visibility environments, and more specifically to navigation aids for use by emergency response and other personnel (e.g., firefighters) in smoky, foggy, dark, or similar environments.

BACKGROUND OF THE INVENTION

Several occupations require personnel to work in low visibility environments. For example, firefighters often face unfamiliar environments that offer little or no visibility, as when they navigate through a burning building. When a building is on fire, smoke may obscure most or all visibility, fire sprinklers may be pouring water down from the ceiling, debris may accumulate on floors or hang from ceilings (or may disappear from floors or ceilings), etc. The problem of impaired visibility is compounded by the fact that the appearance of the building, and the "landmarks" visible therein, may change as the fire progresses. These adverse conditions will affect a firefighter's ability to navigate through and eventually exit a burning building, and a firefighter who becomes disoriented or lost faces possible injury or death. It would therefore be useful to have available devices and systems that help firefighters and/or other personnel to proactively find their way out of a burning building or other low visibility environment.

SUMMARY OF THE INVENTION

The invention involves a navigation system which is particularly useful to emergency response personnel such as firefighters, and/or to other personnel who work in smoky, dark, and/or other low-visibility environments (such as miners, night security personnel, and the like). To give the reader a basic understanding of some of the advantageous features of the invention, following is a brief summary of preferred versions of the system, with reference being made to the accompanying drawings to assist the reader's understanding. Since this is merely a summary, it should be understood that more details regarding the preferred versions may be found in the Detailed Description set forth elsewhere in this document. The claims set forth at the end of this document then define the various versions of the invention in which exclusive rights are secured.

The navigation system includes a portable detection unit configured to be carried or worn by a user, with FIG. 1 illustrating a firefighter 10 bearing a portable detection unit 100 mounted adjacent the air tank 12 of his/her self-contained breathing unit. FIG. 3 then schematically depicts preferred components of the portable detection unit 100. Initially, the portable detection unit 100 preferably includes one or more acceleration sensors 102 (e.g., accelerometers), with each acceleration sensor 102 generating acceleration data representing the acceleration of the portable detection unit 100. A 3-axis accelerometer, i.e., an accelerometer detecting acceleration along three orthogonal axes, is particularly preferred for use as the acceleration sensors 102. The portable detection unit 100 also preferably includes one or more orientation sensors 104, e.g., gyroscopes 104a and/or compasses 104b, which will be individually and collectively referred to as orientation sensor 104. Each orientation sensor 104 generates orientation data representing the orientation of the portable detection unit 100, and here a 3-axis gyroscope, i.e., a gyroscope detecting orientation with respect to three orthogonal axes, is particularly preferred for use as the orientation sensor 104. Additionally or alternatively, the portable detection unit 100 may include a wireless signal receiver 106 and a wireless signal transmitter 108, wherein the wireless signal receiver 106 of one portable detection unit 100 is configured to receive wireless signals from a wireless signal transmitter 108 of another portable detection unit 100. Alternatively and/or additionally, the wireless signal receiver 106 may receive wireless signals transmitted from beacons 200 droppable by the user (as shown in FIGS. 1, 6, and also FIG. 4, wherein several beacons 200a, 200b, 200c, etc. are illustrated), and/or in static "reference locations," such as on a fire truck 300 (as shown in FIG. 4) and/or in a portable initialization pad 400 placed at a desired location by a user. As will be discussed below, wireless signal detection can be used to determine the position of a portable detection unit 100 (or of a beacon 200 or reference location 300/400) via signal location/triangulation techniques. It is also (or alternatively) useful to provide a wireless receiver 106 on the portable detection unit 100, as well as a wireless transmitter 108, simply to enable communication of data between users bearing the portable detection units 100, and/or between such units 100 and others (e.g., to a commander at the fire truck 300 or at another monitoring station).

Referring back to FIG. 3, the portable detection unit 100 also includes a processor 110 (such as a microprocessor) which receives any acceleration data and orientation data from the sensors 102 and 104, and uses it to generate position data representing the position of the portable detection unit 100. This can be done, for example, by integrating the acceleration data over time to obtain position data. Thus, by tracking position/orientation data over time, the processor 110 can maintain a record of where the user is, as well as where the user has been. For example, the processor 110 can maintain a record of a firefighter's route as he/she entered a structure, which also represents a record of a possible escape route. The processor 110 can also account for the relative locations of other portable detection units 100, beacons 200, and/or reference locations 300/400, with these relative locations being received at least in part by the wireless signal receiver 106. To illustrate, the wireless signal receiver 106 and processor 110 may receive a signal from a portable detection unit 100, beacon 200, and/or reference location 300/400 which directly communicates the position of the signal transmitter. Alternatively, the wireless signal receiver 106 may receive signals from a signal transmitter, as well as from other transmitters, which allow the processor 110 to determine positions via signal triangulation.

The portable detection unit 100 then includes a visual display 112 (see FIGS. 1 and 2) whereupon the position data may be shown, with this visual display 112 preferably being mounted adjacent a user's head for hands-free viewing. The visual display 112 can usefully take the form of a liquid crystal display or other display having electrically-actuated pixels, a window or screen upon which an image may be projected, or some other form of display. As best seen in FIG. 2, the visual display 112 is preferably of the transparent "heads up" type whereby a user can see through the display 112, with the image on the display 112 being effectively superimposed on the user's field of view. The means for mounting the visual display 112 adjacent a user's head may take the form of a hat (such as a firefighter's helmet 14), a cap (such as an insulating/cushioning cap or webbing, which is often worn under a helmet 14), a headband, a visor, goggles, or other wearables which a user may situate on or about his/her head, and/or fasteners, clips, and/or other devices for attaching the visual display 112 to such headwear. Alternatively (or additionally), the mounting means could take the form of a harness or the like which situates the visual display 112 on the user's shoulder or chest, or hook-and-loop or other fasteners which attach the visual display on a shoulder or chest. As will be discussed in greater detail below, the visual display 112 therefore allows the user to monitor his/her position versus one or more of (1) the user's past position(s) (i.e., versus the user's recent path), (2) other users' positions (and/or their past position(s)), (3) the positions of beacons 200, and/or (4) the positions of reference locations 300/400.

As noted above, the system also preferably includes one or more portable beacons 200 which may be carried by a user along with the portable detection unit 100, and which may be dropped at desired locations by a user, e.g., at ingress/egress locations (such as doors and windows), at hazardous locations (such as at pits or other places of missing or unstable walking surfaces), or other locations which might be usefully noted by a user. FIGS. 1, 4, and 6 illustrate exemplary versions of such beacons 200, wherein the beacons 200 bear clips 202 (FIG. 6) allowing them to be mounted on a user's belt 16 (FIG. 1) for easy removal. Each beacon 200 preferably has a lamp 204 (e.g., a strobing or constantly illuminated high-intensity light) allowing easy visual location of a beacon 200, and/or a wireless signal transmitter 206 allowing wireless location of the beacon 200 by use of the wireless signal receiver 106 (via signal location/triangulation techniques). Preferably, the lamp 204 and/or wireless signal transmitter 206 are automatically activated when the user drops the beacon 200, or removes the beacon 200 from the user's belt 16 or other article of clothing. For example, referring to FIG. 6, an area on the beacon 200 adjacent the clip 202 may bear a switch 208 which detects unclipping of the beacon 200, and/or the clip 202 itself may itself serve as a switch by bearing electrical contacts which detect contact with the body of the beacon 200. Thus, a user may carry and drop the beacon 200 at a desired location to serve as a marker, with the beacon 200 being visible owing to the lamp 204 and/or having its position shown on the visual display 112 owing to a wireless signal transmitter 206.

The use of the system to allow a firefighter to visually monitor his/her position in a burning building or other low-visibility environment is then illustrated by FIGS. 4 and 5, wherein FIG. 4 illustrates a number of firefighters 10a, 10b, 10c, etc. within a building 50 (which is depicted only schematically, with its walls being depicted in solid lines), and wherein an exemplary possible view seen by the firefighter 10a on the visual display 112 is shown in FIG. 5. As each firefighter 10a, 10b, 10c, etc. moves through the building 50, his/her portable tracking unit 100a, 100b, 100c, etc. tracks his/her position via the position/direction data generated from the acceleration and orientation sensors 102 and 104, and/or via wireless signal location/triangulation techniques (e.g., via monitoring signal time-of-receipt from reference locations such as from the fire truck 300 and/or the initialization pad 400). Where position/direction data is generated from the acceleration and orientation sensors 102 and 104, all firefighters may "zero" (initialize) their positions and orientations to a common location and direction, as by standing at an indicated location on the initialization pad 400 and at an indicated orientation (e.g., facing forwardly), and then setting a reference location (at the pad 400) and direction (in FIG. 4, toward the building 50) via an input device 114 (shown in FIG. 3, for example, a "zeroing button" on the portable tracking unit 100). Thus, the present and past positions of the firefighters 10a, 10b, 10c, etc. may be tracked, and may be wirelessly communicated to all firefighters (and/or to a monitoring station, e.g., within the fire truck 300) via the wireless receivers and transmitters 106 and 108 in their portable tracking units 100a, 100b, 100c, etc. Similarly, if the dropped beacons 200 include wireless transmitters 206, the positions of the dropped beacons 200 may be wirelessly transmitted to the portable tracking units 100a, 100b, 100c, etc. of the firefighters. Thus, on the visual display 112 of FIG. 5, the firefighter 10a is iconically depicted by a star in the center of his/her display 112, a nearby firefighter 10b is depicted by a triangle, and the positions of nearby beacons 200a, 200b, and 200c are illustrated by circles. Here, the view on the display 112 is oriented in alignment with the direction that the firefighter 10a was facing when he/she initialized his/her position at the initialization pad 400: as the firefighter 10a stood on the initialization pad 400 and set a reference location (at the pad 400) and direction (toward the building 50), the view on the display 112 adopted an orientation whereby the central top-to-bottom axis of the display 112 remains oriented in the reference direction. The firefighter 10a preferably remains centered on the display 112 as he/she moves about the building 50, with the relative locations of other firefighters 10b, 10c, 10d, etc. and beacons 200a, 200c, 200d, etc. being continuously or frequently updated on the display 112. The paths traveled by the firefighters 100a, 100b, 100c may also be depicted, with the path of the firefighter 10a being shown in solid lines and the paths of the firefighters 10b and 10c being shown in heavy dashed lines. (The walls of the building 50, depicted in light dashed lines in FIG. 5, are not in reality shown on the display 112 and are merely depicted to better illustrate the correlation between the display 112 of FIG. 5 with the building floor plan shown in FIG. 4.)

BRIEF DESCRIPTION OF THE DRAWINGS

FIG. 1 is a side view of a firefighter 10 wearing an exemplary version of the portable detection unit 100 of the navigation system, with the portable detection unit 100 being mounted on the firefighter's back adjacent to an air tank 12, an associated visual display 112 being mounted to the firefighter's helmet 14, and portable beacons 200 being removably mounted to the firefighter's belt 16.

FIG. 2 is a front view of the firefighter 10 of FIG. 1, showing the exemplary visual display 112 in greater detail.

FIG. 3 schematically depicts the exemplary portable detection unit 100, illustrating the acceleration sensor 102, orientation sensor 104 (i.e., gyroscope(s) 104a and/or compass 104b), wireless signal receiver 106, and wireless signal transmitter 108 in communication with the processor 110 within the portable detection unit 100, and with an external visual display 112 and input device 114 (e.g., a "zeroing button" or other controls) externally mounted in communication with the processor 110.

FIG. 4 illustrates an exemplary perspective view of several firefighters 10a-10e equipped with respective portable navigational units 100a-100e, with the firefighters exploring a building having walls 50 depicted in heavy solid lines (with the paths of the firefighters 10a-10e from an initialization pad 400 being shown in dashed lines), with several portable beacons 200a-200g being placed by the firefighters 10a-10e at entry/exit points (and with the beacons 200a-200d used for interior entries/exits being configured differently than the beacons 200e-200g used for exterior entries/exits).

FIG. 5 illustrates an exemplary view of the arrangement of FIG. 4 that might be seen on the visual display of the firefighter 10a, showing the firefighter 10a centrally depicted as a star (with the path of the firefighter 10a shown as a heavy solid line), nearby firefighter 10b depicted as a triangle (with the path of the firefighter 10b shown as a heavy dashed line), and nearby beacons 200a-200c depicted as circles, and with the walls of the building being shown in fine dashed lines to better allow the reader to correlate the view of FIG. 5 with that of FIG. 4 (the walls usually not in reality being shown on the visual display).

FIG. 6 illustrates an exemplary portable beacon 200 with a clip 202 for mounting the beacon 200 to an article of clothing or the like (e.g., the belt 16 of FIG. 1), with a switch 208 being situated adjacent the clip 202 to activate a lamp 204 and/or a wireless signal transmitter 206 when the beacon 200 is unclipped.

DETAILED DESCRIPTION OF PREFERRED VERSIONS OF THE INVENTION

To elaborate on the foregoing discussion, the exemplary portable detection unit 100 illustrated in FIG. 3 includes an acceleration sensor 102 wherein the measured acceleration data—which is preferably measured along three orthogonal axes—is integrated over time within the processor 110 to obtain position data. Since the axes along which acceleration measurements occur within the acceleration sensor 102 will generally not remain fixed as the user moves about his/her environment, the orientation sensor 104 (i.e., gyroscope 104a and/or compass 104b) can be used to monitor the true orientations of the acceleration measurement axes so that the processor 110 can compute acceleration/position along reference axes (e.g., the XYZ axes of the acceleration sensor 102 at a reference location, such as at the initialization pad 400). As an example, with reference to FIG. 4, as a user stands on a defined location on the initialization pad 400—such as on a set of forward-facing footprints printed on the initialization pad 400—the user can instruct the processor 110 (e.g., via input device 114) to zero out the reference axes for the acceleration sensor 102 and the orientation sensor 104, such that position measurements thereafter are measured/calculated from a reference location (zero X, Y, and Z coordinates) set at the initialization pad 400. The processor 110 of the portable detection unit 100 may thereafter record the unit's position measurements (thereby storing a user's past route), display present and/or past positions on the visual display 112, transmit present and/or past positions to others via the wireless signal transmitter 108, etc.

As a redundant system, the wireless signal receiver 106 and/or transmitter 108 may also be used to track the position of the portable detection unit 100 by use of signal triangulation, signal time-of-flight, or other signal location techniques. As an example, signal transmitters located elsewhere—for example, at the front and rear of the fire truck 300, and/or within the initialization pad 400—could transmit signals, and their respective times off light to the wireless signal receiver 106 of the portable detection unit 100 can be used by the processor 110 to calculate the position of the portable detection unit 100 with respect to the transmitters. (For accurate distance calculation, the distance between the transmitters must be known, and thus it is useful to situate the transmitters on the fire truck 300, where they will rest at a fixed and known distance apart.) Conversely, the wireless signal transmitter 108 could broadcast a signal which might be measured by distant receivers (for example, at the front and rear of the fire truck 300, and/or at the initialization pad 400), and the time off light to the receivers can then be used to determine the relative position of the portable detection unit 100. Here, the position might then be broadcast back to the portable detection unit 100 for receipt at the wireless signal receiver 106. It should be understood that a wide variety of other signal location techniques could be used instead.

In the foregoing system, the position determination provided by the acceleration sensor 102 and the orientation sensor 104 is used as the primary means for tracking the position of the portable detection unit 100, and the position determination provided by the wireless signal receiver 106 and/or transmitter 108 is simply provided as a redundant safeguard. Since the position determination provided by the sensors 102 and 104 can drift over time, the position determination provided by the signal receiver 106 and/or transmitter 108 provides a useful check, and can be used to periodically reset the measurements of the sensors 102 and 104 with respect to the reference axes. Conversely, since the position determination provided by the signal receiver 106 and/or transmitter 108 can experience error in areas of electromagnetic interference and/or shielding, the position determination provided by the sensors 102 and 104 can be used when wireless signal strength weakens or becomes erratic. It should therefore be understood that the portable detection unit 100 might only use the acceleration sensor 102 and the orientation sensor 104 for position tracking, or it might only use the signal receiver 106 and/or transmitter 108, or it could use these systems together, either continuously or in switched intervals.

However, it is in any event preferred that the signal receiver 106 and transmitter 108 be provided along with the acceleration sensor 102 and the orientation sensor 104 for data communication purposes. This allows the signal receiver 106 to receive the transmitted positions of nearby users (as transmitted by their portable detection units 100), and so that the signal transmitter 108 can likewise transmit the position of its own portable detection unit 100 to nearby users (to be received by their portable detection units 100). Thus, it should be understood that the signal receiver 106 and transmitter 108 can be used to simply communicate positions instead of (or in addition to) serving as a means for determining position. In this respect, the signal receiver 106 and transmitter 108 can also serve to carry standard communications, such as radioed voice signals, to further enhance their versatility and reduce the need for the user to carry separate radio communications equipment. Depending on the functions to be performed by the signal receiver 106 and transmitter 108, and factors such as the frequencies at which they are to operate, it may be necessary for the portable detection unit 100 to include more than one signal receiver 106 and/or transmitter 108 (e.g., one to assist in position determination and one to share position data or other communications between users).

With regard to the sharing of position data or other communications between users, such sharing may extend to users other than those wearing portable detection units. For instance, referring to FIG. 3, the user 10a may be sending to (and receiving from) not only the other users 10b, 10c, etc., but also to a commander at the fire truck 300 or at another monitoring station.

The portable detection unit 100 is preferably mountable to a user, or to a user's article of clothing or other accessory (e.g., on the air tank 12 in FIG. 1), but it could instead be carried. For example, rather than taking the form depicted in FIG. 1, the portable detection unit 100 might instead take the form of a module which interfaces with a Personal Digital Assistant or other palmtop computer, or with a multifunction cellular telephone or other personal communications device, in which case the portable detection unit 100 might utilize the processor, visual display, or other components of these devices as its own processor 110, visual display 112, etc. Ideally, if constructed with sufficiently small size and weight, the portable detection unit 100 could be entirely borne on a user's helmet 14 or other headgear along with the visual display 112.

As suggested by the foregoing discussion, the visual display 112 may be situated separately from the portable detection unit 100 (as in FIG. 1), or it may instead be situated directly on the portable detection unit 100. When situated separately, the visual display 112 may communicate with the portable detection unit 100 by wired or wireless communications, with FIG. 1 illustrating a communications cable running from the portable detection unit 100 up the user's back to the visual display 112 on the helmet 14. The visual display 112 can be situated in any position which is easily viewed or accessed by the user, such as on a user's wrist or helmet 14.

It is emphasized that the visual display 112 can display position information in a wide variety of different formats. The user, other users, beacons, reference locations, and the like can be symbolically displayed with different shapes/icons, alphanumeric characters, colors, behaviors (e.g., blinking versus "static" icons), and other visual characteristics. The visual display 112 may only display the current position of the user (and of other users), or it may display past positions as well, thereby showing the path(s) traveled by the user(s). In FIG. 5, which depicts an exemplary display that might be seen by user 10*a*, the path of the user 10*a* is displayed as a heavy solid line, whereas those of colleagues 10*b* and 10*c* are shown as dashed lines (and colleague 10*c* is not shown in the display, being slightly out of range of the area shown on the display). Further, the display of FIG. 5 always depicts the user 10*a* at the center of the display, with the boundaries of the depicted display moving as the user 10*a* moves about his/her environment, but it is also or alternatively possible to have the displayed environment remain static and have the depiction of the user 10*a* move about the display in accordance with his/her position. Similarly, while the display of FIG. 5 has been described as showing the displayed environment with a static orientation—i.e., the display of FIG. 5 was described as always depicting the environment of the building 50 in FIG. 4 with an orientation defined by the reference orientation, with the top of the display being oriented in the X direction of FIG. 4, and the right of the display being oriented in the Y direction of FIG. 4—it is instead possible to have the depicted display assume the orientation of the user, such that the top of the display in FIG. 5 is always aligned with the direction in which the user is facing. The depicted display is also not limited to showing positions of users, beacons, etc. only in the XY plane, and it could also depict positions of users, beacons, etc. which are offset from the user in the Z direction, i.e., on different levels/floors. In this case, the display could (for example) show positions of lower users, beacons, etc. in one color if their height is 5 or more feet below the user, and could show positions of higher users, beacons, etc. in another color if their height is 5 or more feet above the user. As an alternative, the display might only show users, beacons, etc. if their height is within 5 feet of the user's height, such that users, beacons, etc. may appear and disappear as the user moves from floor to floor. As yet another example, the display might show positions of all users, beacons, etc. at all heights/levels in an isometric display, perhaps as a set of XY grids stacked in the Z direction, with the users, beacons, etc. being displayed on the grids corresponding to the heights at which they are situated.

As noted previously and shown in FIG. 4, an initialization pad 400 may be used to "zero" the position and orientation measured by the portable detection unit 100, at least when an acceleration sensor 102 and orientation sensor 104 are used for position monitoring. The initialization pad 400 could simply take the form of a lightweight and easily portable mat formed of plastic or other materials, preferably elastomeric or other skid-resistant materials, and which preferably bears footprints or other indicia printed thereonto indicate to a user where the user should stand (and in which direction the user should face) when initializing position and orientation. Thus, initialization may be accomplished by simply having a user stand on the initialization pad 400 at the reference location, facing in some direction which defines the reference direction(s), and pressing an initialization button or other input device 114 (see FIG. 3) on the portable detection unit 100. However, it should be understood that a distinct initialization pad 400 need not be provided, and initialization may instead occur at any defined location, such as at some point on a fire truck (e.g., by a user standing immediately adjacent some location on the fire truck, and facing the fire truck). It is also possible for different portable detection units to be initialized at different locations—for example, consider if the initialization pad 400 was formed as an elongated carpet with several adjacent sets of footprints printed thereon, or if users each stood with their backs against assigned locations on the fire truck. In this instance, so long as the relative positions of these reference locations are known, the portable detection units might communicate with each other to all adopt the same reference location and orientation (i.e., to zero out their position and orientation measurements to the same reference location and directions).

Prior discussions noted that the navigation system may optionally incorporate the use of portable beacons to assist users in navigating throughout a burning building or other area of low visibility. The exemplary beacon 200 of FIGS. 1 and 6 preferably includes both a lamp 204 and a wireless signal transmitter 206, both of which are activated when the switch 208 is triggered (which will automatically occur when the clip 202 of the beacon 200 is removed from the user's belt or other article of clothing). When the navigation system is intended for use by firefighters in burning environments, the beacon 200 is designed to be temperature-resistant, and is preferably brightly colored so that it visually stands out with respect to its surroundings. The lamp 204 (if included) is preferably of high intensity, as by using a xenon, halogen, or LED array light source, and may strobe at a regular frequency to enhance its visibility. Apart from the lamp 204, the beacon 200 might include a sound generator (such as a siren or tone generator) to allow the beacon 200 to be audibly located. If it is desired to have the portable detection unit 100 locate the beacon 200 rather than (or in addition to) having the user visually or audibly locate it, the beacon 200 may include the wireless signal transmitter 206 so that the beacon 200 may be found by use of wireless signal location/triangulation techniques. The wireless signal transmitter 206 might also be used to transmit data regarding the surroundings of the beacon 200; for example, the beacon 200 might include a temperature sensor, and the wireless signal transmitter 206 might transmit information to a portable detection unit 100 (or to a monitoring station) regarding the detected temperature. In similar respects, the lamp 204 might visibly communicate information regarding sensed environmental conditions—for example, it may begin to strobe, or change strobe frequency, or change color, depending on the nearby temperature.

Different beacons may be differently configured (i.e., may have different shapes, sizes, colors, strobe frequencies, tones, etc.) for different purposes. For example, the beacons 200a-200d in FIG. 4 are shown with a different configuration than the beacons 200e-200g because the beacons 200a-200d are intended to mark interior entryways between different rooms, whereas the beacons 200e-200g are intended to mark ingress/egress points for the building 50 (with the user 10e walking about the building 50 to mark the ingress/egress for his/her colleagues). In similar respects, the beacons 200a-200d may appear on the display of FIG. 5 with a different appearance than that of the beacons 200e-200g. Beacons may include some means for facilitating attachment to a nearby structure (e.g., to walls, beams, doors, etc.), such as sharp hooks/prongs which protrude from a beacon and which embed into wood, plaster, or similar materials when a beacon is slapped against a structure; protruding hooks or loops allowing a beacon to be quickly mounted over the top of a door, or about a door handle; lasso-like loops or wire ties which may be quickly fit about a structure, and then contracted or tied to hold the beacon on the structure; and so forth. In this respect, the means for facilitating attachment of a beacon to a user (such as clip 202) may also be designed to facilitate attachment to building structure. However, beacons could alternatively lack any attachment means, and can simply be carried by hand or in pocket, and may be dropped at desired locations. It is useful to have a beacon automatically activate its wireless, visible, audible, or other signal when the beacon is deployed (i.e., detached from the user, dropped, or attached to a structure), and the exemplary beacon 200 illustrates such an arrangement via the switch 208, which may be a simple contact switch detecting contact with the clip 202 (with such contact occurring when the beacon 202 is unclipped from the user). However, other activation arrangements are possible, such as including an activation push button on a beacon; including a pin on a beacon which is pulled when the beacon is removed from the user; having a beacon automatically activate when moved out of range of a short-range wireless signal emitted by a portable detection unit; or simply having a beacon activate upon contact with a floor or the like (with impact being detected by an internal accelerometer or similar structure).

Beacons are naturally preferably designed for rugged conditions and rough handling, though they need not necessarily be designed for reuse. As a practical matter, when used in burning buildings and the like, many will be sacrificed even if intended for reuse. The lifespan of beacons can be enhanced by including flame-resistant countermeasures such as a compartment filled with compressed inflammable/insulating expanding foam, wherein high temperatures cause the compartment to breach and release the foam, thereby hopefully protecting a beacon from flame for a longer period of time. However, it is not able that beacons need not necessarily maintain signal communication for the entire length of time over which users may battle ablaze. Once a beacon is dropped and it transmits a position signal to nearby portable detection units, its position may be stored and displayed by the portable detection units even after the beacon has been consumed by flame and ceases transmission. Thus, beacons can effectively continue to mark entryways or other landmarks even after they are no longer operational.

Prior discussions have noted that beacons may include wireless signal transmitters for use in wireless signal location and/or for signal communication (e.g., to transmit data from sensors on the beacons). It is also possible for beacons to include wireless signal receivers for wireless signal location or other purposes. In particular, it is useful for beacons to include both signal transmitters and receivers, and also possibly signal boosters, so that beacons may serve as "relay stations" for passing on transmissions from users, beacons, etc. in environments where transmission might otherwise be poor. As an example, in a building having many metallic structures, transmissions from/between users and beacons may be inhibited. However, if receiving/transmitting beacons are regularly dropped so as to serve as a "transmission network" for wireless signals, the wireless signals may be able to effectively bypass the metal obstructions—for example, by passing signals between users via a series of intermediate "relay" beacons.

Beacons may be "virtual" as well as (or instead of) physical. Thus, rather than dropping a physical beacon, a user might use the input device 114 (FIG. 3) as he/she walks about the environment to mark a reference location which corresponds to a virtual beacon. As an example, as a user walks past an entryway, he/she could use the input device 114 to set a virtual beacon along the positions stored by the processor 110 without dropping a real beacon.

Since the detection units, beacons, etc. are designed for portability, they are preferably battery-powered, and should be designed for easy recharging or replacement of the batteries. Where rechargeable batteries are used, it is useful to have these components rest in a charging cradle when not in use, with the charging cradle communicating power to the components via direct connection to a power source, or alternatively by inductive power transfer or other non-connective arrangements. A "low battery" light or similar indicator of battery levels is also usefully included.

In a prototypical model of the portable detection unit 100, the acceleration sensor 102 is an ADXL321 three axis accelerometer provided by Analog Devices (Norwood, Mass.); the gyroscope 104a is an ADXRS300EB three axis gyroscope provided by Analog Devices (Norwood, Mass.); the processor 110 is an AVR-7004 microprocessor provided by Atmel (San Jose, Calif.); and the visual display 112 is an OLED (Organic Light Emitting Diode) Microviewer screen provided by eMagin (Bellevue, Wash.). No wireless signal receiver 106 and transmitter 108 were included, but these can be chosen in accordance with their desired functionality (i.e., whether these are to perform or assist in position determination, and/or whether they are to communicate position data or other communications between users).

It should be understood that various exemplary versions of the invention have been shown and described above to illustrate different possible features of the invention and how to implement them. However, since these are merely examples, modifications are also considered to be within the scope of the invention. Following is an exemplary list of modifications.

First, the acceleration sensors 102 and orientation sensors 104 need not measure acceleration and orientation in three axes (though this is preferred). As a simple example, a portable detection unit 100 might be simplified to only include an acceleration sensor 102 measuring movement in the XY plane, and a compass 104b which measures orientation about the Z axis (i.e., in the XY plane). However, when motion is measured in further degrees of freedom, greater versatility and accuracy is achieved.

Second, a portable detection unit 100 can include many features beyond those noted above. As an example, the user 10 of FIGS. 1-2 might also carry a thermal camera on his/her helmet 14, and the thermal information on the camera might be conveyed to the portable detection unit 100 so that "hot zones" can be displayed on users' visual displays 112. As another example, a laser and/or ultrasonic ranging device could be provided on a helmet 14, and its information could be provided to the portable detection unit 100 so that walls and similar features can be displayed on users' visual displays 112. As yet another example, the portable detection unit 100 may monitor inputs from various sensors to monitor a user's condition or environment, for example, heart rate sensors and oxygen level indicators, and the data could then be transmitted via the wireless signal transmitter 108 to a monitoring station.

Third, the processor 110 of a portable detection unit 100 might have the capacity to receive and store building schematics or other maps (either wirelessly or via loading from a data port, removable memory, or the like), and to apply them to a user's visual display 112 so that the user can monitor his/her position, and that of colleagues, versus prerecorded landmark data. The maps can be construction plans or other production drawings, or they could instead be "maps" generated by a user's prior exploration of the environment in question, with a portable detection unit 100 recording the results. The results could then be saved and loaded to the same or other portable detection units 100 when needed. As an example, emergency response personnel at a refinery, chemical production plant, or the like might use portable detection units 100 to prepare maps of landmarks which they can then use later in case of emergency.

Fourth, while the navigation system has been described as using the acceleration sensor 102 and the orientation sensor 104, and/or the wireless signal receiver 106 and/or transmitter 108, for tracking the position of the portable detection unit 100, other systems may also or alternatively be used for position tracking. As one example, while the foregoing discussion implies that the wireless signal receiver 106 and transmitter 108 operate via transmission and reception of radio frequency signals, transmission and reception along other electromagnetic bands, and/or along optical/visible bands or via sound (e.g., ultrasonic bands), is also or alternatively possible. As another example, Global Positioning System (GPS) tracking, or tracking via competing satellite position monitoring services, might be used. At the time this invention was developed, GPS systems did not provide sufficient resolution to be very useful, but future systems may be more suitable.

It should also be understood that while the invention is particularly intended for use by firefighters and similar emergency response personnel, it could be used by other users as well, such as night security personnel and other security and/or law enforcement personnel, soldiers and other military personnel, miners, and industrial workers who work in areas of impaired visibility. The invention can also be used recreationally, e.g., by players involved in war games and "shooter" games (e.g., paintball).

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A navigation system including two or more portable detection units, each portable detection unit being configured to be carried or worn by a user, with each portable detection unit comprising:
   a. one or more acceleration sensors, each acceleration sensor generating acceleration data representing the acceleration of the portable detection unit;
   b. one or more orientation sensors, each orientation sensor generating orientation data representing the orientation of the portable detection unit;
   c. a processor receiving the acceleration data and orientation data, and generating therefrom position data representing the position of the portable detection unit;
   d. a visual display whereupon the position data is shown;
   e. mounting means for mounting the visual display adjacent a user's head; and
   f. an input device in communication with the processor, wherein user actuation of the input device sets a reference location within the processor;
   with the navigation system further including a portable initialization pad separate from the portable detection units, whereby users using the portable detection units may each actuate their input devices at the initialization pad, thereby setting at least substantially the same reference location for all portable detection units.

2. The navigation system of claim 1 wherein:
   a. the acceleration sensors include an accelerometer, and
   b. the orientation sensors include at least one of:
      (1) a gyroscope, and
      (2) a compass.

3. The navigation system of claim 1 wherein:
   a. the acceleration sensors include accelerometers configured to detect acceleration along three orthogonal axes; and
   b. the orientation sensors include gyroscopes configured to detect orientation with respect to three orthogonal axes.

4. The navigation system of claim 1:
   a. wherein each portable detection unit further includes a wireless signal transmitter transmitting the position data from the processor;
   b. further including a monitoring station receiving the position data from the wireless signal receiver of each portable detection unit,
   whereby a user at the monitoring station may monitor the position of each portable detection unit and its user.

5. The navigation system of claim 1 wherein each portable detection unit further includes:
   a. a wireless signal transmitter transmitting the position data from the processor;
   b. a wireless signal receiver receiving the position data transmitted from the wireless signal transmitters of the other portable detection units,
   whereby the portable detection units may communicate their respective position data by use of their wireless signal transmitters and wireless signal receivers.

6. The navigation system of claim 1 wherein each portable detection unit further includes a portable beacon separable from the portable detection unit, wherein:
   a. the beacon is attachable to a garment worn by a user;
   b. removal of the beacon from the garment is detected at the processor; and
   c. the visual display displays the position at which the beacon was removed.

7. The navigation system of claim 1 wherein each portable detection unit further includes a portable beacon separable from the portable detection unit, wherein the beacon includes:
   a. a lamp thereon, and
   b. a switch wherein triggering of the switch activates the lamp,
   whereby a user may carry and drop the beacon at a desired location to serve as a marker.

8. The navigation system of claim 1:
   a. further including a portable beacon separable from one of the portable detection units, the portable beacon including a wireless signal transmitter;

b. wherein:
  (1) the portable detection unit from which the portable beacon is separable further includes a wireless signal receiver receiving wireless signals transmitted from the portable beacon,
  (2) the processor of the portable detection unit from which the portable beacon is separable receives the wireless signals transmitted from the portable beacon, and generates therefrom position data representing the position of the portable beacon;
whereby a user may carry and drop the beacon at a desired location and monitor the user's position relative to the dropped beacon.

9. The navigation system of claim 8 wherein the beacon:
a. is attachable to a garment worn by a user,
b. includes a switch situated thereon, wherein the switch is triggered by detachment from the garment, and
c. triggering of the switch activates the wireless signal transmitter within the beacon.

10. The navigation system of claim 8 wherein the beacon includes a lamp thereon.

11. The navigation system of claim 1 wherein:
a. each portable detection unit:
  (1) is provided in combination with one or more wireless signal transmitters separate and spaced from the portable detection unit;
  (2) further includes a wireless signal receiver receiving wireless signals from the wireless signal transmitters, and
b. the processor of each portable detection unit additionally receives data from the wireless signal receiver and generates position data therefrom representing the position of the portable detection unit relative to the wireless signal transmitters.

12. The navigation system of claim 11 further including portable beacons carryable and droppable by a user, each portable beacon including one of the wireless signal transmitters, whereby a user may carry and drop the beacons at desired locations and monitor the user's position relative to the dropped beacons.

13. A navigation system including a portable detection unit configured to be carried or worn by a user, the portable detection unit comprising:
a. at least one accelerometer;
b. at least one gyroscope;
c. a wireless signal receiver receiving wireless signals from a wireless signal transmitter spaced from the portable detection unit;
d. a processor:
  (1) receiving data from the accelerometer and gyroscope and generating position data therefrom representing the position of the portable detection unit, and
  (2) receiving data from the wireless signal receiver and generating position data therefrom representing the position of the wireless signal transmitter relative to the portable detection unit,
e. a visual display whereupon the position data is shown, and
f. mounting means for mounting the visual display adjacent a user's head, the navigation system further including a portable initialization pad separate from the portable detection unit, whereby a user using the portable detection unit may initialize the position data at the initialization pad, thereby setting a reference location for the portable detection unit at the location at which the user places the portable initialization pad.

14. The navigation system of claim 13 including two or more of the portable detection units of claim 13, wherein each of the portable detection units includes a wireless signal transmitter transmitting position data representing the position of the portable detection unit, whereby each portable detection unit communicates its position data to the other portable detection units.

15. The navigation system of claim 13 including at least two of the portable detection unit, wherein:
a. each portable detection unit further includes an input device in communication with the processor, and
b. user actuation of the input device sets the reference location within the processor,
whereby users using the portable detection units may each actuate their input devices at the initialization pad, thereby setting at least substantially the same reference location for all portable detection units.

16. The navigation system of claim 13 wherein the portable initialization pad includes the wireless signal transmitter.

17. The navigation system of claim 13 in combination with a vehicle separate from the portable detection unit, wherein the vehicle includes the wireless signal transmitter.

18. The navigation system of claim 13 including at least two of the portable detection unit, wherein each of the portable detection units includes a wireless signal transmitter transmitting position data representing the position of the portable detection unit, whereby each portable detection unit communicates its position data to the other portable detection units.

19. The navigation system of claim 1 wherein:
a. the portable initialization pad includes a wireless signal transmitter, and
b. the processor of the portable detection unit receives wireless signals transmitted from the wireless signal transmitter, and generates therefrom position data representing the position of the portable detection unit relative to the wireless signal transmitter.

20. The navigation system of claim 1 in combination with a vehicle separate from the portable detection unit, wherein:
a. the vehicle includes a wireless signal transmitter, and
b. the processor of the portable detection unit receives wireless signals transmitted from the wireless signal transmitter, and generates therefrom position data representing the position of the portable detection unit relative to the wireless signal transmitter.

* * * * *